United States Patent Office 3,755,514
Patented Aug. 28, 1973

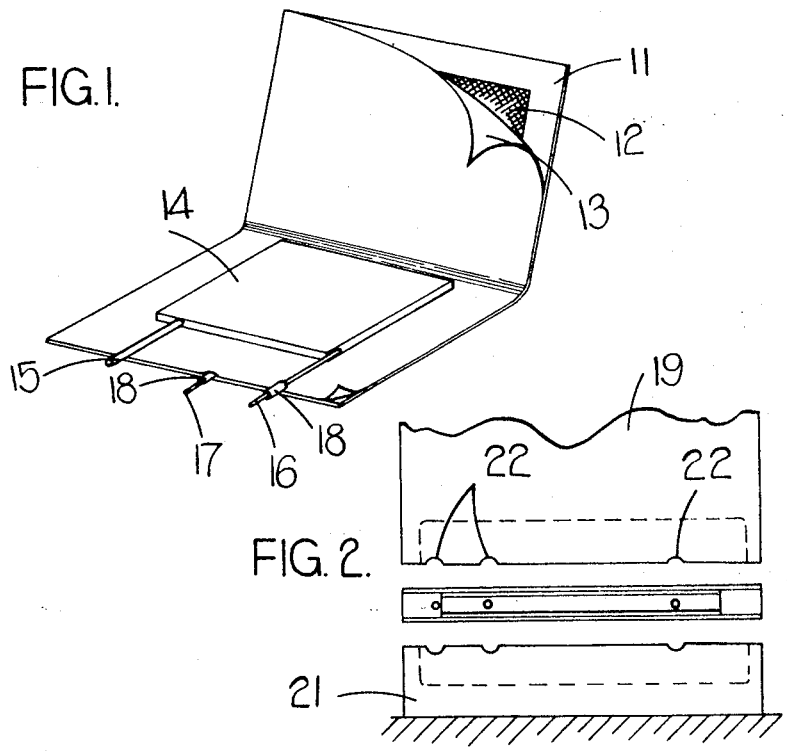
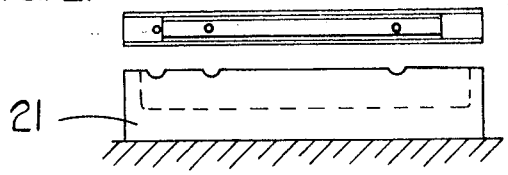
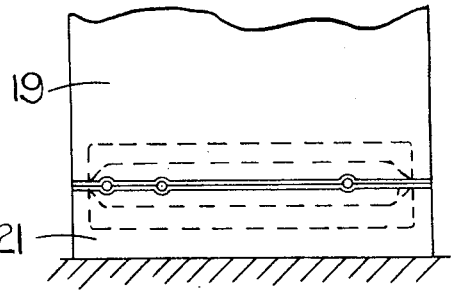
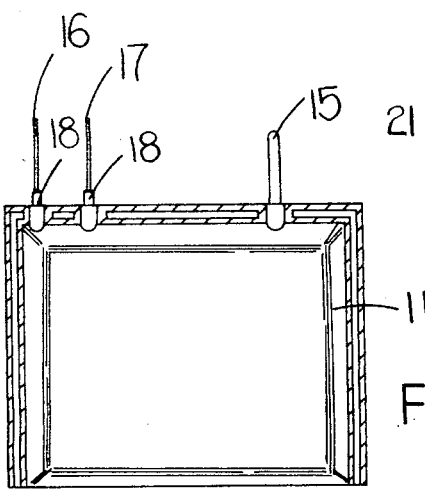

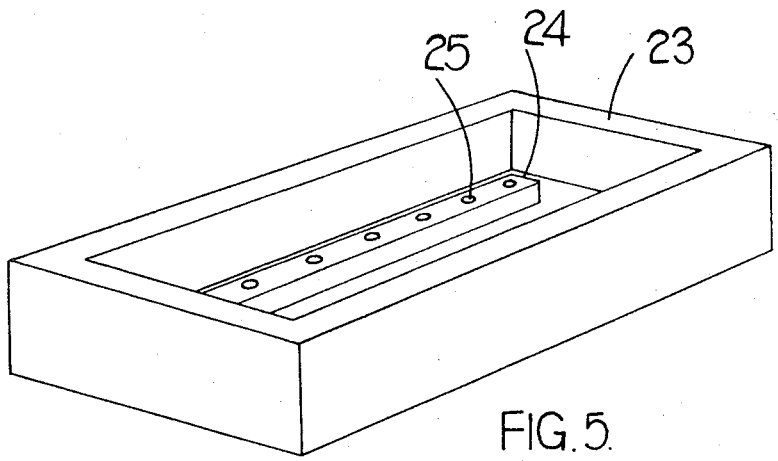
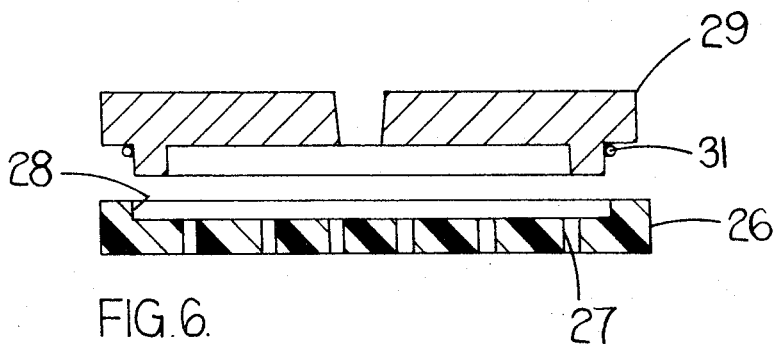

3,755,514
METHOD OF MAKING PRIMARY METAL-AIR BATTERIES
Derek Roger Bennett, Sutton Coldfield, England, assignor to Joseph Lucas (Industries) Limited, Birmingham, England
Filed Mar. 30, 1972, Ser. No. 239,585
Claims priority, application Great Britain, Apr. 27, 1971, 11,511/71
Int. Cl. B29c 6/00
U.S. Cl. 264—23
6 Claims

ABSTRACT OF THE DISCLOSURE

A method of manufacturing a primary metal-air battery comprises starting with a plurality of electrically connected metal-air battery cells, each of which includes a pair of electrically connected air electrodes positioned on opposite sides respectively of a metal anode and insulated therefrom. Each air electrode includes catalyst material supported on a sheet of porous material, with each pair of sheets of porous material being joined together at their peripheries to define a cell compartment, and with a removable pin extending into each cell compartment and projecting from the peripheries of the pair of sheets defining the respective cell compartment. The cells are positioned in a mould with the removable pins being received in respective holes in the mould and a settable compound is introduced into the mould. The compound is then allowed to set so as to form a body extending between and joining adjacent cells, and the pins are removed from their respective cells so as to leave apertures in the body through which electrolyte can be introduced into the cell compartments respectively of the battery.

---

This invention relates to primary metal-air batteries.

In one aspect, the invention resides in a method of manufacturing a primary metal-air battery comprising the steps of:

(a) starting with a plurality of electrically interconnected metal-air battery cells each of which includes a pair of electrically interconnected air electrodes positioned on opposite sides respectively of a metal anode and insulated therefrom, each air electrode including catalyst material supported on a sheet of porous material with each pair of sheets of porous material being joined together at their peripheries to define a cell compartment, and with a removable pin extending into each cell compartment and projecting from the peripheries of the pairs of sheets defining the respective cell compartment, (b) positioning the cells in a mould with said removable pins being received in respective holes in the mould, (c) introducing a settable compound into the mould, (d) allowing the compound to set so as to form a body extending between and joining adjacent cells, and (e) removing said pins from their respective cells so as to leave apertures in the body through which electrolyte can be introduced into the cell compartments respectively of the battery.

Conveniently, each pair of sheets of porous material which define a cell compartment of the battery are constituted by respective parts of a single strip of said porous material, the strip being folded to allow the sheets to be joined together at their peripheries.

Preferably, said porous material is polytetrafluorethylene.

Preferably, the joint between each pair of sheets of polytetrafluorethylene is formed by ultrasonic welding.

Conveniently, the metal anode of each cell is insulated from the air electrodes of the cell by means of a porous, insulating material interposed therebetween, the porous insulating material being arranged to melt during the ultrasonic welding process and thereby flow into the pores of the polytetrafluorethylene sheets so as, on cooling, to form the required joint between each pair of sheets of polytetrafluorethylene.

Preferably, the mould is arranged so that the body, produced on setting of said settable compound, is formed with a channel which communicates with said apertures in the body so that a manifold can be positioned in said channel to facilitate introduction of electrolyte into the cell compartments of the battery through said apertures respectively.

Conveniently the mould is formed of a silicon rubber and said settable compound is an epoxy resin.

In a further aspect the invention resides in a primary metal-air battery manufactured by a method as described in the preceding paragraphs, In the accompanying drawings, FIGS. 1 to 4 are diagrammatic illustrations of four stages respectively of a method according to one example of the invention, FIG. 5 is a perspective view of a mould used in a further stage of the method shown in FIGS. 1 to 4, and FIG. 6 is a sectional view of a body produced by the mould shown in FIG. 5 and of a manifold used to facilitate filling of the cell compartments of the battery with electrolyte.

Referring to the drawings, in the manufacture of a primary metal-air battery, each cell of the battery is produced by starting with a strip 11 of microporous PTFE and metallising, such as for example with nickel, one surface of the strip. A layer of catalytically active material 12 is then applied to the one surface of the strip 11, the layer 12 defining a pair of electrically interconnected air electrodes in the finished cell, and the active material 12 is then covered by a strip 13 of a porous, insulating, weldable material of substantially the same dimensions as the strip 11. The strip 13 is preferably in the form of the random-fibre polyamide material sold under the trade name Bondina. A metal anode 14 is then placed on the strip 13 and a removable pin 15 is positioned on the strip 13 adjacent the anode 14 so as to extend from the peripheral edges of the strips 11, 13. A pair of electrical leads 16, 17 provide the electrical connections respectively to the anode 14, by way of the metallisation, and to the active material 12, the leads 16, 17 extending parallel to the pin 15 and terminating at their free ends beyond the edge of the strips 11, 13. Each of the leads 16, 17 is provided with a PVC sleeve 18 which extends around the portion of its respective lead 16, 17 as the lead extends from the peripheral edges of the sheets 11, 13.

The strip 11 is then folded about its centre lines so as to trap the anode 14, the pin 15 and the leads 16, 17 with their respective sleeves 18 between folded portions of the strip 13. The cell assembly is then sealed so as to define within the folded portions of the strip 11, a cell compartment containing the metal anode 14 and the pair of electrically interconnected air electrodes. The sealing operation involves forming a liquid tight joint between the folded portions of the strip 11 at the peripheries of the folded portions and between the strip 11 and the sleeves 18, although since one peripheral edge of the cell assembly is defined by a fold in the strip 11, the joint is only required to extend around three sides of the metal anode 14 as is shown in FIG. 4. Sealing of the cell assembly is effected by means of ultrasonic welding tool 19, the tool 19 comprising a vibrating tool 20 and a support anvil 21 positioned on opposite sides respectively of the folded strip 11. The vibrating tool 20 and support anvil 21 are each shaped so as to only engage the strip 11 at the portions of the strip where the seal is to be effected. Further, the vibrating tool 20 and support anvil 21 are each provided with recess 22 in the regions thereof which engage the pin 15 and the leads 16, 17 respectively during the sealing operation. The provision of the recesses 22 prevents excessive pressure being applied by the tool 19 to the leads 16, 17 and the pin 15 and allows the strip 11 to be moulded to the correct shape around the leads and the pin.

During the ultrasonic joining operation portions of the weldable strip 13 and the sleeves 18 adjacent the periphery of the cell assembly are caused to melt, the melted portions flowing into the pores of the porous PTFE strip 11 which is not of course melted by the ultrasonic energy. Thus on cooling a liquid tight, joint is formed between the folded portions of the strip 11 and between the sleeves 18 and the strip 11. The joining operation also serves to mould the sleeves 18 around the leads 16, 17 respectively so that the leads are held in position relative to the cell asembly. It is to be appreciated that, if desired, a double seal can be formed between the folded portions of the strip 11, such a double seal being shown in FIG. 4. Further it is to be appreciated that other methods of joining than ultrasonic heating could be used to form the joint between the folded portions of the strip 11, such as the use of a heated blade, and further other porous materials than PTFE could be used to defined the strip 11. Moreover, although in the above example the substrate of each air electrode of the cell forms part of a single strip of porous material, if required, a pair of sheets of porous material could be used to define the substrate respectively of the air electrodes.

The method described above can then be repeated to produce the required number of cells for the battery, each cell having the configuration shown in FIG. 4. Alternatively, if an elongated strip of PTFE is used in the above method a plurality of cells can be produced with each cell being joined to an adjacent cell by the strip. The cell compartment of each cell is then defined within portions of the elongated strip obtained by folding the strip along its longitudinal centre line and then forming a liquid tight seal around the anode of each cell. The strip of joined cells is then divided up to produce the plurality of individual cells required in the battery.

The finished cells are then mounted in a rack (not shown) with the edge of each cell from which the leads 16, 17 and the pins 15 extend projecting from the rack. The electrical connections between adjacent cells are completed by way of the leads 16, 17, and the rack, together with the cells, is inverted into a mould 23 formed of a silicone rubber material as sold by I.C.I. Limited as Silkoset 105. The mould 23 includes a platform 24 extending upwardly from the base of the mould and formed in the platform 24 are a plurality of holes 25. The holes 25 are arranged so that when the cells are inverted into the mould the pins 15 carried by the respective cells are received in the holes 25 respectively. To provide the external connections in the finished battery, respective conductive studs (not shown) are connected to the lead 16 in one end cell of the rack assembly and the lead 17 in the other end cell, the studs being pressed into complementary recesses (not shown) in the base of the mould 23 when the cells are in position in the mould. A settable epoxy resin is then introduced into the mould 23 so as to cover the platform 24 and the edges of the cells presented to the base of the mould. In the particular example, the epoxy resin is Araldite mixed with balls of a phenolic material and the Araldite mixture is introduced into the mould from a pressurised dispenser. The settable compound is then allowed to set, which in the case of Araldite is effected by maintaining the compound at 60° C. for two hours. On setting, a moulded body 26 is formed which extends between and joins adjacent cells, the body 26, together with the cells, then being withdrawn from the mould. The pins 15 carried by the cells respectively are arranged so as to be retained in the holes 25 in the mould, so that when the body 26 is removed from the mould the body is formed with a plurality of apertures 27 each of which communicates with a cell compartment of a respective cell. Since the holes 25 are formed in a platform in the mould 23, the apertures 27 extend from the base of a channel 28 formed in one surface of the body 26. The body 26 defines part of the casing of the battery, and, in the finished battery, since the apertures 27 communicate with the cell compartments respectively of the battery, activation of the battery is effected by introducing electrolyte into the cell compartments by way of the apertures 27. Preferably, when activation of the battery cells is to be effected, a manifold 29 is engaged in the channel 28 in the body 26, the manifold 29 carrying a rubber sealing ring 31 to seal the channel 23 when the manifold 29 is engaged therewith. The electrolyte used to activate the battery cells is most preferably a 45% solution of potassium hydroxide although solutions containing between 15 and 50%, or more preferably between 40% and 50% potassium hydroxide can be used. The electrolyte solution is introduced into the manifold 29 from an ampule, the manifold 29 being arranged so that the electrolyte flows from the manifold, through the apertures 27 in the body 26 and into the respective cell compartments.

I claim:

1. A method of manufacturing a primary metal-air battery comprising the steps of:
    (a) starting with a plurality of electrically interconnected metal-air battery cells each of which includes a pair of electrically interconnected air electrodes positioned on opposite sides respectively of a metal anode and insulated therefrom, each air electrode including catalyst material supported on a sheet of porous material with each pair of sheets of porous material being joined together at their peripheries to define a cell compartment, and with a removable pin extending into each cell compartment and projecting from the peripheries of the pairs of sheets defining the respective cell compartment,
    (b) positioning the cells in a mould with said removable pins being received in respective holes in the mould,
    (c) introducing a settable compound into the mould,
    (d) allowing the compound to set so as to form a body extending between and joining adjacent cells, and
    (e) removing said pins from their respective cells so as to leave apertures in the body through which electrolyte can be introduced into the cell compartments respectively of the battery.

2. A method as claimed in claim 1 wherein each pair of sheets of porous material which define a cell compartment of the battery are constituted by respective parts of a single strip of said porous material, the strip being folded to allow the sheets to be joined together at their peripheries.

3. A method as claimed in claim 1 wherein said porous material is polytetrafluorethylene.

4. A method as claimed in claim 3 wherein the metal anode of each cell is insulated from the air electrodes of the cell by means of a porous, insulating material interposed therebetween, the porous insulating material being arranged to melt during an ultrasonic welding process and thereby flow into the pores of the polytetrafluorethylene sheets so as, on cooling, to form the required joint between each pair of sheets of polytetrafluorethylene.

5. A method as claimed in claim 1 wherein the mould is arranged so that the body, produced on setting of said settable compound, is formed with a channel which communicates with said apertures in the body so that a manifold can be positioned in said channel to facilitate introduction of electrolyte into the cell compartments of the battery through said apertures respectively.

6. A method as claimed in claim 1 wherein the mould is formed of a silicone rubber and said settable compound is an epoxy resin.

References Cited

UNITED STATES PATENTS

| 3,120,572 | 2/1964 | Shannon | 264—261 |
| 3,084,391 | 4/1963 | Parstorfer | 264—272 |
| 3,595,700 | 7/1971 | Rosansky | 264—249 |
| 3,436,006 | 4/1969 | Cole | 264—23 |

FOREIGN PATENTS

| 669,154 | 3/1952 | Great Britain | 264—272 |

DONALD J. ARNOLD, Primary Examiner

T. E. BALHOFF, Assistant Examiner

U.S. Cl. X.R.

264—261, 272, 275